United States Patent
Ko et al.

(10) Patent No.: US 8,911,919 B2
(45) Date of Patent: Dec. 16, 2014

(54) LOCAL HYDROPHILIC GAS DIFFUSION LAYER AND FUEL CELL STACK COMPRISING THE SAME

(71) Applicants: Hyundai Motor Company, Seoul (KR); Kia Motors Corporation, Seoul (KR)

(72) Inventors: Haeng Jin Ko, Seoul (KR); Young Bum Kum, Seoul (KR); Kook Il Han, Seoul (KR); Yun Seok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/944,174

(22) Filed: Jul. 17, 2013

(65) Prior Publication Data

US 2013/0302723 A1    Nov. 14, 2013

Related U.S. Application Data

(63) Continuation of application No. 13/114,614, filed on May 24, 2011, now abandoned.

(30) Foreign Application Priority Data

Sep. 29, 2010    (KR) ........................ 10-2010-0094523

(51) Int. Cl.
| | |
|---|---|
| *H01M 8/04* | (2006.01) |
| *H01M 8/02* | (2006.01) |
| *H01M 4/88* | (2006.01) |
| *B60L 11/18* | (2006.01) |
| *H01M 8/10* | (2006.01) |

(52) U.S. Cl.
CPC ........ *H01M 8/04291* (2013.01); *H01M 8/0247* (2013.01); *H01M 8/023* (2013.01); *Y02E 60/50* (2013.01); *B60L 11/1892* (2013.01); *Y02T 90/34* (2013.01); *H01M 2008/1095* (2013.01); *B60L 11/1898* (2013.01)
USPC ............................................ 429/535; 429/480

(58) Field of Classification Search
USPC .................................................. 429/535, 480
See application file for complete search history.

(56) References Cited

U.S. PATENT DOCUMENTS

| | | |
|---|---|---|
| 6,960,407 B2 | 11/2005 | Shibata et al. |
| 2004/0209136 A1 | 10/2004 | Ren et al. |
| 2006/0141338 A1 | 6/2006 | Wang et al. |

(Continued)

FOREIGN PATENT DOCUMENTS

| | | | |
|---|---|---|---|
| JP | 07262997 A | * | 10/1995 |
| JP | 2001-110432 | | 4/2001 |

(Continued)

*Primary Examiner* — Gregg Cantelmo
(74) *Attorney, Agent, or Firm* — Edwards Wildman Palmer LLP; Peter F. Corless

(57) ABSTRACT

The present invention provides a local hydrophilic gas diffusion layer configured to enhance the water removal performance of a fuel cell For this purpose, the present invention provides a gas diffusion layer in which a region under each of a pair of lands, which receives a clamping pressure of the fuel cell stack, is subjected to local hydrophilic treatment by a simple process, thereby enhancing the water removal performance of the fuel cell stack. In particular, the local hydrophilic gas diffusion layer has a first region under each land of the separator which receives the clamping pressure; and a second region under the gas channel of the separator, wherein the first region is subjected to hydrophilic treatment.

1 Claim, 3 Drawing Sheets

(56) References Cited

U.S. PATENT DOCUMENTS

| | | |
|---|---|---|
| 2007/0092785 A1 | 4/2007 | Eickhoff |
| 2008/0020252 A1 | 1/2008 | Gao |
| 2009/0317686 A1 | 12/2009 | Huston et al. |
| 2010/0129696 A1 | 5/2010 | Hong et al. |

FOREIGN PATENT DOCUMENTS

| | | |
|---|---|---|
| JP | 2003197203 A | 7/2003 |
| JP | 2005-038780 | 2/2005 |
| JP | 200538780 | 2/2005 |
| JP | 2006-147397 | 6/2006 |
| JP | 2006-193612 A | 7/2006 |
| JP | 2007-273326 A | 10/2007 |
| JP | 2007-323975 A | 12/2007 |
| JP | 2009-181778 | 8/2009 |
| JP | 2010-232083 | 10/2010 |
| JP | 2010232083 A | 10/2010 |
| KR | 10-2007-0016101 | 2/2007 |
| KR | 10-0792869 | 1/2008 |

\* cited by examiner

LOCAL HYDROPHILIC GAS DIFFUSION LAYER AND FUEL CELL STACK COMPRISING THE SAME

CROSS-REFERENCE TO RELATED APPLICATION

This application is a Continuation application of U.S. patent application Ser. No. 13/114,614, filed May 24, 2011 which claims under 35 U.S.C. §119(a) the benefit of Korean Patent Application No. 10-2010-0094523 filed Sep. 29, 2010, the entire contents of which are incorporated herein by reference.

BACKGROUND (a) Technical Field

The present invention relates to a gas diffusion layer and a fuel cell stack comprising the same. More particularly, it relates to a local hydrophilic gas diffusion layer configured to enhance the water removal performance of a fuel cell, and a fuel cell stack comprising the same.

(b) Background Art

A fuel cell is an electrical generation system that does not convert chemical energy of fuel into heat by combustion, but rather electrochemically converts the chemical energy directly into electrical energy in a fuel cell stack. Fuel cells can be applied to the electric power supply of small-sized electrical and electronic devices, for example portable devices, as well as industrial and household appliances and vehicles.

One of the most widely used fuel cells for a vehicle is a proton exchange membrane fuel cell or a polymer electrolyte membrane fuel cell (PEMFC), which includes a fuel cell stack having a membrane electrode assembly (MEA), a gas diffusion layer (GDL), a gasket, a sealing member, and a bipolar plate (separator). Generally, the MEA includes a polymer electrolyte membrane, through which hydrogen ions are transported and an electrode/catalyst layer, in which an electrochemical reaction takes place, is disposed on each of both sides of the polymer electrolyte membrane. The GDL functions to uniformly diffuse reactant gases and transmit generated electricity. The gasket functions to provide an appropriate airtightness to reactant gases and coolant. The sealing member functions to provide an appropriate bonding pressure. The bipolar plate functions to support the MEA and GDL, collect and transmit generated electricity, transmit reactant gases, transmit and remove reaction products, and transmit coolant to remove reaction heat, etc.

The fuel cell stack is composed of a plurality of unit cells, each of the unit cells including an anode, a cathode, and an electrolyte (electrolyte membrane). Hydrogen, as fuel, is supplied to the anode ("fuel electrode", "hydrogen electrode" or "oxidation electrode") and oxygen as oxidant is supplied to the cathode ("air electrode", "oxygen electrode" or "reduction electrode").

The hydrogen supplied to the anode is dissociated into hydrogen ions (protons, $H^+$) and electrons (e) by a catalyst disposed in the electrode/catalyst layer. The hydrogen ions are transmitted to the cathode through the electrolyte membrane, (a cation exchange membrane), and the electrons are transmitted to the cathode through the GDL and the bipolar plate.

At the cathode, the hydrogen ions supplied through the (polymer) electrolyte membrane and the electrons transmitted through the bipolar plate react with the oxygen in the air supplied to the cathode to produce water.

Migration of the hydrogen ions causes electrons to flow through an external conducting wire, which generates electricity and heat.

The electrode reactions in the fuel cell can be represented by the following formulas:

Reaction at the anode: $2H_2 \rightarrow 4H^+ + 4e^-$
Reaction at the cathode: $O_2 + 4H^+ + 4e^- \rightarrow 2H_2O$
Overall reaction: $2H_2 + O_2 \rightarrow 2H_2O + $ electrical energy + heat energy As shown in the above formulas, water is produced from the reaction occurring in the fuel cell. It is known that the water content in the fuel cell stack is directly related to the humidity of the electrolyte membrane, the flow of hydrogen as the fuel, the flow of air as the oxidant, and the durability of the electrode catalyst. Therefore, the management of produced water is a very important technique that ultimately determines the performance of the fuel cell.

U.S. Pat. No. 6,967,039 discloses a diffusion media and a process for its fabrication to address issues related to water management in electrochemical cells. The diffusion media includes a mesoporous layer (MPL) formed by providing a coating having a hydrophobic component, a hydrophilic component, and a pore forming agent on a substrate formed of a carbon material having excellent electrical conductivity.

Moreover, U.S. Pat. No. 7,332,240 discloses a diffusion media including a mesoporous layer which is divided into a high water region and a low water region so as to enhance water transfer properties of at least one of first and second diffusion layer substrates in the high water region and diminish water transfer properties of at least one of first and second diffusion layer substrates in the low water region, thus ensuring water preservation.

However, the diffusion media, including the mesoporous layer, simultaneously have water repellent properties and water retention properties due to the nature of the structure of the mesoporous layer, and thus it is practically difficult to divide the regions according to the amount of water. Especially, in the case of a serpentine channel, it is quite difficult to divide the regions. In detail, the region where water is accumulated is changed according to the amount of current, the operating temperature, and the gas moisture content in the fuel cell stack, and thus the amount of water produced and the drainage capacity do not accord with each other. Therefore, it is difficult to apply the division of the regions to the serpentine channel system.

Meanwhile, U.S. Pat. No. 7,250,189 discloses an electroconductive porous substrate, such as carbon fiber paper with an electroconductive polymer deposited on the carbon fibers of the paper, used as a wicking material or diffusion medium in a fuel cell.

However, to remove water through the wicking mechanism, the entire gas diffusion layer should be hydrophilic. Although it is advantageous to allow water to flow from the electrode to the gas diffusion layer, it is disadvantageous to allow water to be released to a gas channel, and thus it is difficult to achieve the desired object of removing the produced water.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a gas diffusion layer configured to effectively remove water produced in a fuel cell stack by a simple process, thereby improving the performance of the fuel cell stack.

In one aspect, the present invention provides a local hydrophilic gas diffusion layer configured to receive a clamping pressure of a fuel cell stack from a separator which includes a pair of lands that form a gas channel. More specifically, the local hydrophilic gas diffusion layer has a first region under each land of the separator which receives the clamping pressure and a second region under the gas channel of the separator. In the embodiment the first region is subjected to hydrophilic treatment.

In an embodiment of the present invention, the first region has pores having a size smaller than that of pores of the second region. In particular, the size of pores of the first region is reduced due to deformation by the clamping pressure of the fuel cell stack.

In another embodiment, the first region is subjected to hydrophilic treatment by constituting the separator as a first electrode, providing a second electrode at the opposite side of the first electrode, and applying an alternating current to water based fluid (e.g., water or steam).

In another aspect, the present invention provides a fuel cell stack having a membrane electrode assembly (MEA) which includes an electrolyte membrane and a catalyst layer disposed on each of both sides of the electrolyte membrane; a separator including a gas channel; and a local hydrophilic gas diffusion layer stacked between the membrane electrode assembly and the separator to receive a clamping pressure of the fuel cell stack from a pair of lands formed on the separator. The MEA also includes a first region under each land of the separator, which is subjected to hydrophilic treatment, and a second region under the gas channel, which is not subjected to hydrophilic treatment.

In yet another embodiment, the first region has pores having a size smaller than that of pores of the second region. In particular, the size of the pores of the first region is reduced due to deformation by the clamping pressure of the fuel cell stack.

In still yet another embodiment, the first region may be subjected to hydrophilic treatment by constituting the separator as a first electrode, providing a second electrode at the opposite side of the first electrode, and applying an alternating current to water based fluid (e.g., water or steam).

In still even yet another embodiment, the fuel cell stack may further have a microporous layer stacked between the local hydrophilic gas diffusion layer and the membrane electrode assembly;

In an even further embodiment, the separator may also have a fixing portion to fix the relative location of the separator and the local hydrophilic gas diffusion layer.

Other aspects and embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
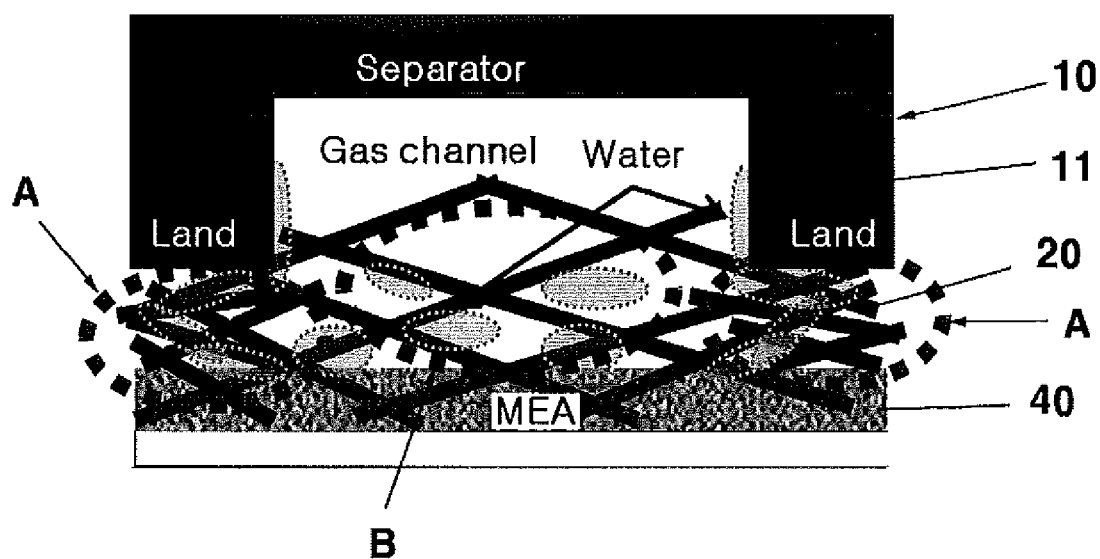
FIG. 1 is a schematic diagram showing the configuration of a fuel cell stack including a local hydrophilic gas diffusion layer in accordance with an exemplary embodiment of the present invention.

Reference numerals set forth in the Drawings includes reference to the following elements as further discussed below:

10: separator
20: gas diffusion layer
30: microporous layer
40: membrane electrode assembly
A: first region
B: second region It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention provides a local hydrophilic gas diffusion layer and a fuel cell stack having the same, in which hydrophilic/hydrophobic properties of the gas diffusion layer are configured to match the location of a gas channel and a pair of lands of a separator, thereby effectively removing water produced in a fuel cell stack.

FIG. 1 is a schematic diagram showing the configuration of a fuel cell stack including a local hydrophilic gas diffusion layer in accordance with an illustrative embodiment of the present invention. The fuel cell stack according to the present invention has a membrane electrode assembly (MEA) which includes (1) a polymer electrolyte membrane, through which hydrogen ions are transported, and an electrode/catalyst layer, in which an electrochemical reaction takes place, disposed on each of both sides of the polymer electrolyte membrane, (2) a gas diffusion layer (GDL) which functions to uniformly diffuse reactant gases and transmit generated electricity, and (3) a separator which functions to support the MEA and GDL, collect and transmit generated electricity, transmit reactant gases, transmit and remove reaction products, and transmit coolant to remove reaction heat, etc.

FIG. 1 shows a part of the fuel cell stack in which a separator 10, a GDL 20, and an MEA 40 are sequentially stacked. As shown in FIG. 1, a porous GDL 20 is located on the MEA 40, and the GDL 20 is connected to the separator 10.

Typically, the GDL is formed of a hydrophobic material such as carbon fiber and polytetrafluoroethylene (PTFE) and has a porous structure which functions to facilitate the discharge of water produced by the electrochemical reaction occurring in the catalyst layer and the supply of reactant gases. The GDL 20 of the present invention also has this type of porous structure.

Meanwhile, in the present invention, the GDL 20 is divided into two regions according to whether the size of pores is reduced by the clamping pressure of the fuel cell stack and according to whether it is subjected to hydrophilic treatment. However, the size of pores and the hydrophilic treatment are defined according to the location of a pair of lands 11 of the separator 10, and thus these divided regions are collectively called a first region (A) and a second region (B) according to whether it is located under the land 11.

The separator 10 of the present invention includes a pair of lands 11 projecting from both ends thereof to form a gas channel, and the lands 11 provide the clamping pressure of the fuel cell stack to a partial region of the GDL 20 in the formation of the stacking structure of the fuel cell stack.

Therefore, in the region under each land 11 to which the clamping pressure of the fuel cell stack is applied, the porous GDL 20 is compressively deformed in the stacking direction by the compressive force directly applied to the GDL 20 by each of the respective lands 11. This region under each land 11 to which the clamping pressure of the fuel cell stack is applied is called the first region (A), and the other region to which the clamping pressure of the fuel cell stack is not directly applied, i.e., the region under the gas channel, is called the second region (B), thus dividing the GDL 20 into two regions.

When comparing the two regions of the GDL 20, the size of pores of the GDL 20 is reduced by the deformation in the first region (A) under each land 11, and thus the size of the pores in the first region (A) is smaller than that of the pores in the second region (B), which is not deformed by the clamping pressure of the fuel cell stack.

Meanwhile, the GDL 20 of the present invention is composed of a local hydrophilic GDL 20 of which a part is subjected to hydrophilic treatment. In the present invention, as shown in FIG. 1, only the region under each land 11 of the GDL 20, i.e., the first region (A), is subjected to hydrophilic treatment. On the contrary, the second region (B), which is not subjected to hydrophilic treatment, has hydrophobic properties.

A process in which water is removed from the GDL 20 having the above-described configuration will be described in detail below. As shown in FIG. 1, differently from the hydrophobic second region (B) with large pores, the product water in the hydrophilic treated first region (A) with small pores passes through the GDL 20 by the capillary effect and is effectively discharged to the lands 11.

The water discharged to the lands 11 through the GDL 20 is discharged along with the gas flow on the wall of the gas channel due to the location relationship between the wall of the gas channel and the lands 11. That is, the water discharged through the GDL 20 easily forms a liquid film flow on the wall of the gas channel, which effectively enhances the water removal performance of the electrode and the periphery thereof.

Figure 2:
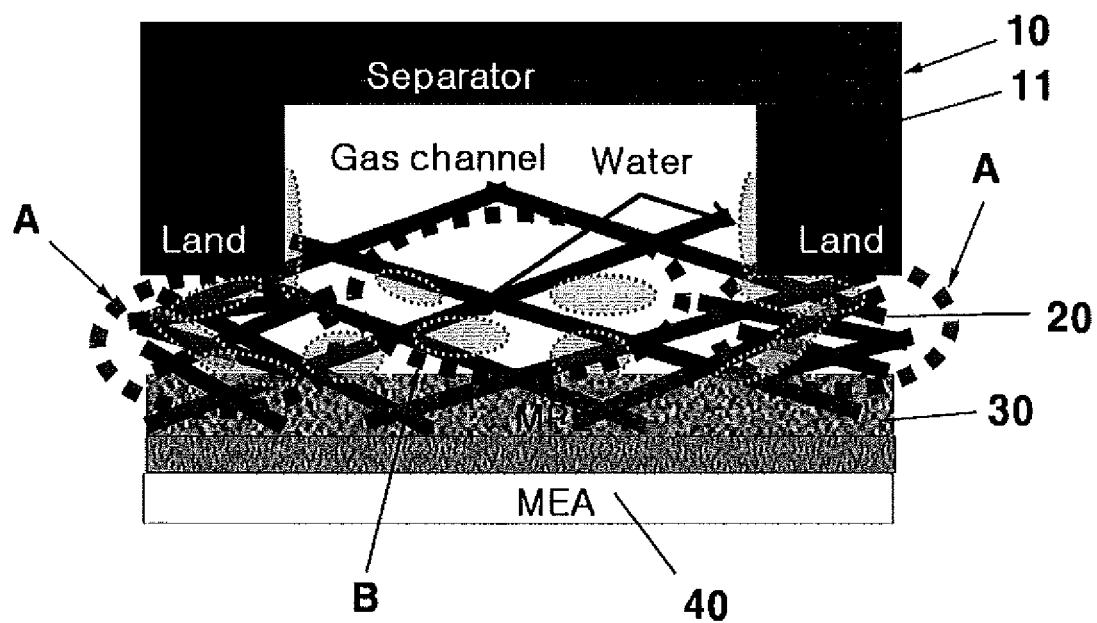
FIG. 2 is a schematic diagram showing the configuration of a fuel cell stack including a local hydrophilic gas diffusion layer and a microporous layer in accordance with another exemplary embodiment of the present invention.

FIG. 2 shows the configuration of a fuel cell stack including a microporous layer (MPL) 30 in accordance with another embodiment of the present invention.

As shown in FIG. 2, according to another embodiment of the present invention, the microporous layer 30 is interposed between the GDL 20 and the MEA 40 to further enhance the water removal performance of the GDL 20.

Figure 3:
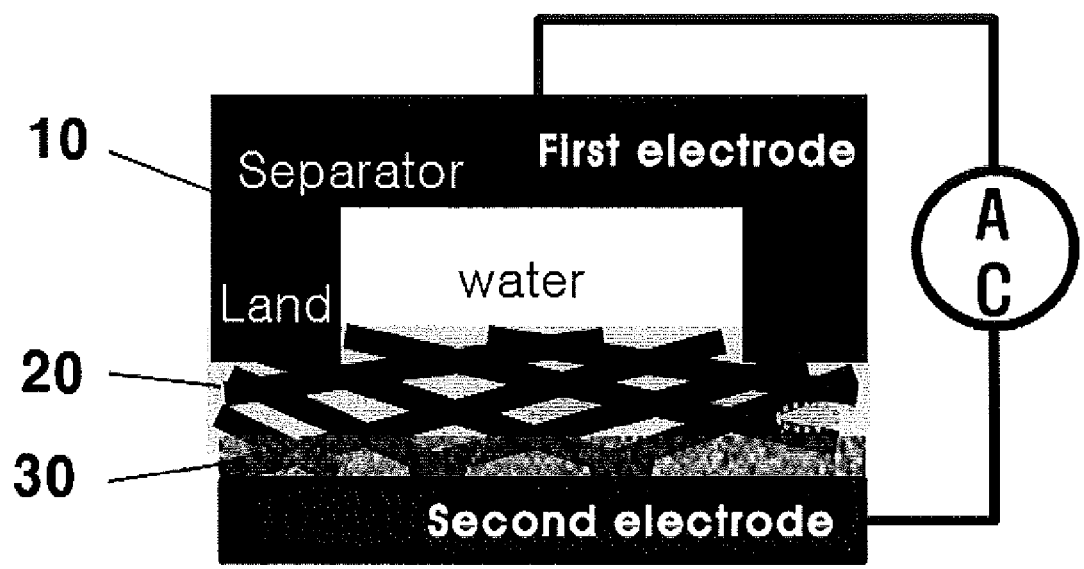
FIG. 3 is a schematic diagram showing a process of manufacturing a local hydrophilic gas diffusion layer in accordance with an exemplary embodiment of the present invention.

FIG. 3 is a schematic diagram showing a process of creating a local hydrophilic GDL 20 in accordance with an embodiment of the present invention.

In this embodiment, the hydrophilic treatment is carried out in the following manner. When an alternating current is applied to a water based fluid (e.g., water or steam), a water molecule ($H_2O$) is ionized to form hydrogen ions ($H^+$) and hydroxyl ions ($OH^-$), which substitute C—H on the surface of the carbon fiber or felt with C—OH to have hydrophilicity (automatic hydrophilic interaction).

FIG. 3 shows the automatic hydrophilic interaction. In the present invention, to create the local hydrophilic GDL 20, in which only the first region (A) is subjected to hydrophilic treatment, the separator 10 as a first electrode is connected to the GDL 20. A second electrode is connected to the opposite side of the first electrode, and an alternating current is applied to the first and second electrodes, thereby performing the hydrophilic treatment.

Therefore, the hydrophilic treatment is performed in the region under each land by the application of the alternating current, and thus the GDL 20 is divided into the hydrophilic treated first region (A) and the hydrophobic second region.

As a result, the product water can be discharged from the hydrophilic treated first region (A), in which small pores are formed by the clamping pressure of the fuel cell stack, by the capillary effect, and the discharged water can be removed along with the gas flow on the wall of the gas channel, thereby significantly enhancing the water removal performance of the fuel cell stack.

The fuel cell stack having the local hydrophilic GDL according to the present invention may also include a fixing portion formed on the separator to fix the relative location of the gas channel and the GDL. The fixing portion can be implemented by forming a projection for fixing the location of the separator and the GDL. However, the present invention is not limited to the projection, but any structure that can fix the relative location of the separator and the GDL can be used.

As described above, the local hydrophilic gas diffusion layer and the fuel cell stack having the same according to the present invention have the following effects.

First, it is possible to appropriately configure the gas diffusion layer such that the surface characteristics of the gas diffusion layer are hydrophilic or hydrophobic according to the relative location of the gas channel of the separator and the lands, and thus it is possible to provide the surface characteristics of the gas diffusion layer which are suitable for the removal of water from the fuel cell.

Second, the region of the gas diffusion layer having smaller pores is configured to have the local hydrophilicity by the clamping pressure of the fuel cell stack such that the capillary effect is enhanced, and thus the product water can be discharged through the hydrophilic region while forming a liquid film flow on the wall of the gas channel, thereby significantly enhancing the water removal performance of the fuel cell stack.

Third, it is possible to effectively use the local hydrophilic gas diffusion layer in the anode, in which the water removal is not easy to achieve due to a lack of hydrogen, as well as in the cathode in which the amount of air flow is sufficient.

Lastly, a complicated and expensive process such as the conventional plasma process is not required, and it is possible to simply manufacture the gas diffusion layer of the present invention by including a process for local hydrophilic treatment in the existing process for manufacturing the fuel cell stack. Therefore, it is possible to use the existing techniques, simplify the manufacturing process, and reduce the manufacturing cost.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a local hydrophilic gas diffusion layer configured to receive a clamping pressure of a fuel cell stack from a separator including a pair of lands that form a gas channel, the method comprising:

subjecting only a first region under each land of the separator which receives the clamping pressure to a hydrophilic treatment by:
  using the separator as a first electrode which is connected to the local hydrophilic gas diffusion layer,
  providing a second electrode at the opposite side of the first electrode, and
  performing the hydrophilic treatment only on the first region under each land by applying an alternating current to water or steam only in the first region of the gas diffusion layer through the pair of lands of the separator when the pair of lands of the separator is stacked on the first region of the gas diffusion layer, wherein the first region receives the clamping pressure from the pair of the lands formed on the separator; and
forming the local hydrophilic gas diffusion layer where the first region is hydrophilic and the second region is hydrophobic.

* * * * *